March 2, 1937. H. A. CEDERSTROM 2,072,728
TRAILER HITCH.
Filed July 10, 1933 3 Sheets-Sheet 2

Inventor
HAROLD A. CEDERSTROM
By Paul Paul & Moore
ATTORNEYS

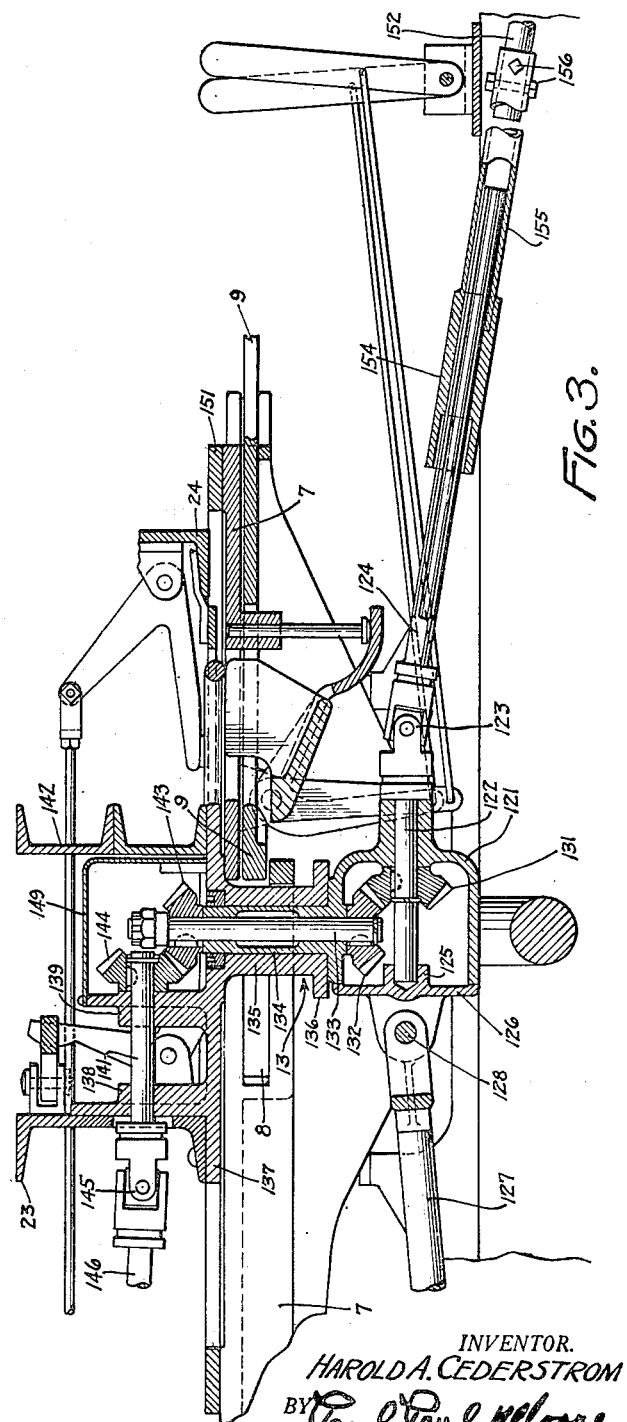

Patented Mar. 2, 1937

2,072,728

UNITED STATES PATENT OFFICE 2,072,728

TRAILER HITCH

Harold A. Cederstrom, Minneapolis, Minn., assignor to Rosco Manufacturing Company, Minneapolis, Minn., a corporation of Minnesota Application July 10, 1933, Serial No. 679,643

12 Claims. (Cl. 180—14)

This invention relates to vehicles having dumping bodies, and more particularly to an improved fifth wheel structure for coupling a power operated trailer to a motor vehicle.

Dumping bodies have heretofore been confined almost entirely to trucks and, in such an apparatus, the body is usually mounted directly upon the truck chassis and operated by a suitable mechanism usually driven from the truck engine. Such dumping trucks are usually of large capacity and therefore require relatively large engines, tires, and other necessary equipment, resulting in heavy operating and maintenance costs, and also in a large initial capital investment.

The use of large trucks on construction work has become a problem with contractors and other users of such apparatus, because of the heavy operating costs involved. State highway departments in various parts of the country have also begun to recognize the fact that extremely heavy loads transported by trucks have a very detrimental effect on the surfacing of highways, with the result that attempts are now being made to limit the weight of such loads. It has therefore been recommended that legislative action be taken to enact laws limiting the load carried per axle of a vehicle so as to avoid the danger of loading the trucks or other vehicles to the point where the load-carrying wheels thereof might damage the paving or road surfacing. In view of the above, it appears that the tendency in the future will be towards lighter equipment and a smaller payload.

The present invention concerns itself with the provision of a load-carrying apparatus, of the dump body type, which is comparatively light in weight and capable of carrying a substantial payload, is simple and inexpensive in construction, and is positive and efficient in operation, whereby the apparatus may be operated at a comparatively low operating and maintenance cost.

An object of the invention is to provide a semitrailer comprising a frame having its rear end portion supported upon suitable load-carrying wheels and having its forward portion provided with a fifth wheel member adapted to be coupled to a complemental fifth wheel member supported upon the rear end of a motor truck or tractor, and said trailer having a load carrying body mounted thereon for tilting movement, and also having a mechanism supported directly upon the trailer for tilting said body to load dumping position, said mechanism being driven from the truck engine through a series of shafts and bevel gears and means also being provided adjacent to the driver's seat for controlling the operation of said mechanism and whereby the trailer dumping mechanism may be operated, regardless of the positions of the trailer and tractor.

A further object of the invention resides in the novel construction of the fifth wheel structure, which comprises a hollow king pin supported upon the trailer member of the fifth wheel structure and having means thereon for transmitting power from the truck engine to a driven mechanism located on the trailer, and said transmitting means being supported entirely by the king pin or fifth wheel member of the trailer, and the king pin being so constructed that the trailer may be readily coupled to or uncoupled from the truck in the usual manner, and without requiring the removal of any bolts or screws.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 3 is a vertical sectional view on the line 3—3 of Figure 2, showing the general construction of the fifth wheel structure.

Figure 1:
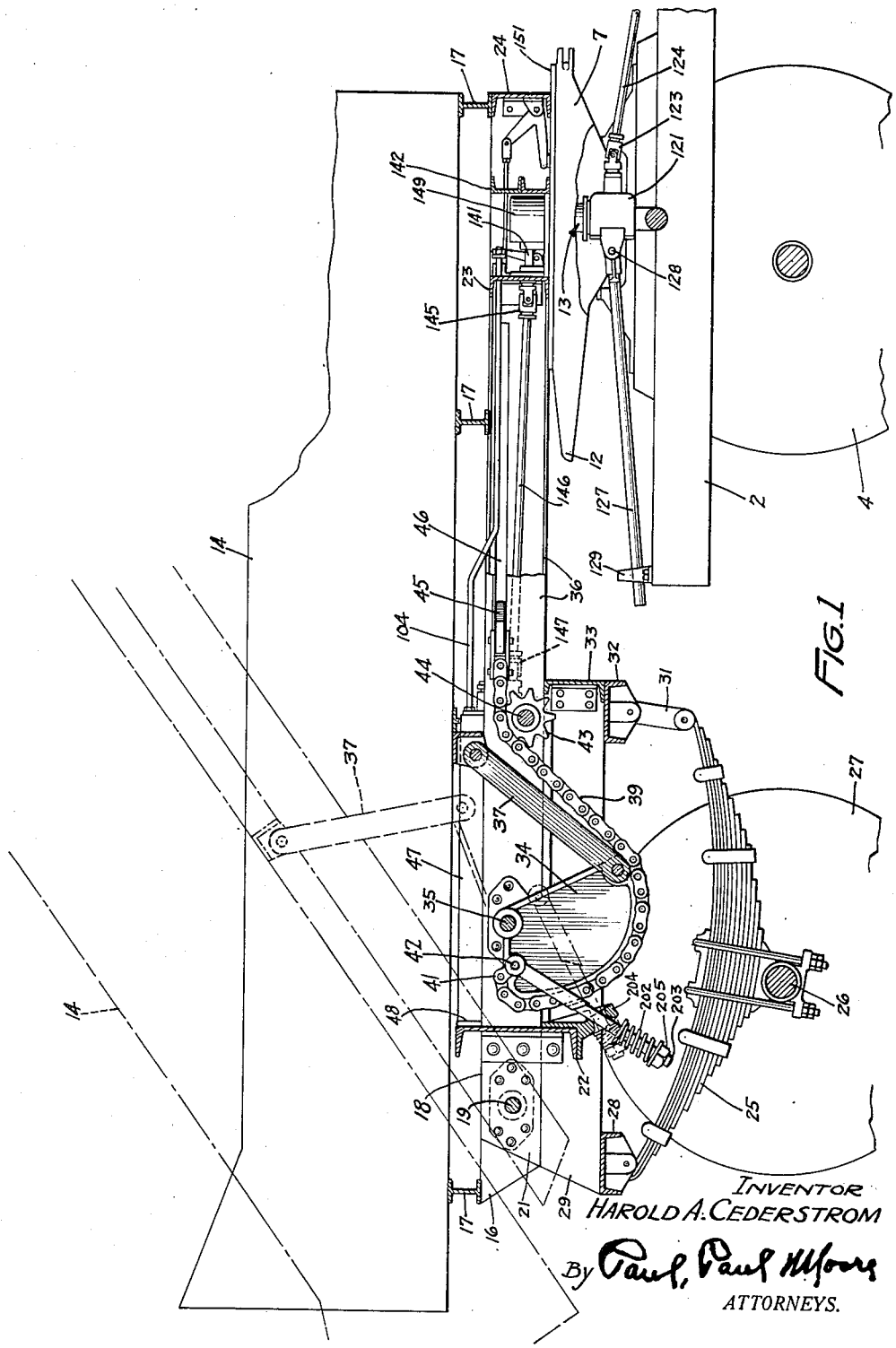
Figure 1 is a side elevation, partially in section, illustrating the mechanism for tilting the load carrying body to a dumping position, and also showing a portion of the fifth wheel structure.
Figure 4:
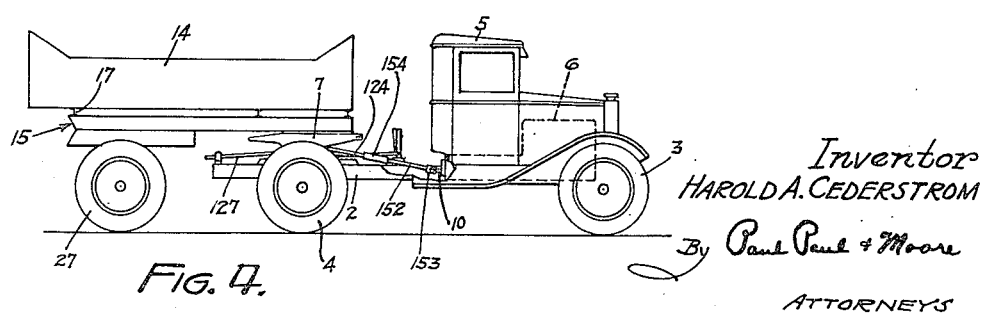
Figure 4 is a diagrammatic view showing the trailer coupled to a truck, and also showing the driving connection between the power take-off shaft of the truck engine and the fifth wheel of the trailer.

Truck.—(Figures 1 and 4)

Figure 2:
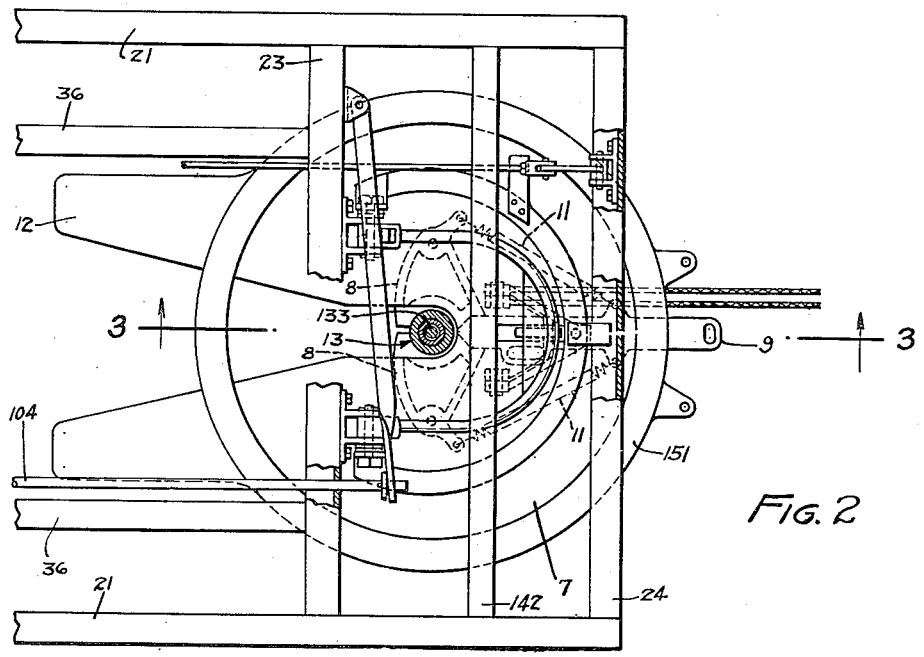
Figure 2 is a plan view showing the dogs for coupling the king pin of the trailer fifth wheel member to the fifth wheel member of the truck.

In the selected embodiment of the invention here shown for purposes of disclosure, there is illustrated in Figure 4, a commercial type of truck comprising the usual chassis 2, front and rear wheels 3 and 4, respectively, cab 5, and engine 6. The engine is shown provided with the usual power take-off shaft 10. The trailer is coupled to the tractor by a suitable fifth wheel structure comprising a lower member 7, pivotally supported upon the chassis 2 by suitable means, not shown. A pair of coupling dogs 8 are shown mounted upon the member 7, and are adapted to be retained in operative positions by a locking bar 9, slidably mounted in suitable guides provided in the fifth wheel member 7. Suitable springs 11 connect the locking bar 9 to the dogs 8, whereby said springs constantly urge the locking bar 9 in a direction to engage the dogs 8. The springs also act to support the dogs in inoperative positions, when the locking bar is moved out of locking engagement therewith. The fifth wheel member 7 is shown provided with rearwardly and downwardly extending arms 12, spaced apart, as shown in Figure 2, to provide a gap therebetween adapted to receive a king pin 13 mounted upon the trailer. The king pin 13 and its supporting means will subsequently be described.

*Trailer.—(Figures 1, 2, and 4)*

The trailer is shown comprising a dumping body 14 having a suitable supporting frame generally indicated by the numeral 15, composed of longitudinally extending side members 16 and transverse members 17, which are interposed between the bottom of the dumping body 14 and the longitudinally extending frame members 16. The dumping body 14 is shown pivotally supported upon a main supporting frame generally indicated by the numeral 18, by a suitable cross shaft 19 mounted in suitable bearings provided at the rear end of the frame 18. The frame 18 constitutes the main supporting frame of the trailer, and comprises side members 21 secured together in spaced relation by suitable cross members 22, 23, and 24. The rear end portion of the trailer frame 18 is resiliently supported upon suitable semi-elliptic springs 25, secured to an axle 26 provided with suitable carrying wheels 27. The rear ends of the springs 25 are shown pivotally connected to a cross member 28 secured to frame members 29 interposed between the cross member 28 and the side frame members 21 of the main frame 18. The forward ends of the springs 25 are connected by suitable shackles 31 to a cross member 32, which also is secured to the frame members 29. The forward ends of the members 29 are shown secured to a suitable transverse channel member 33, as shown in Figure 1. The forward end of the trailer is supported upon the fifth wheel member 7 of the truck, as will subsequently be described.

Means is provided for tilting the body 14 to a load dumping position, as indicated by the dotted lines in Figure 1. Such means comprises a pair of cam members 34 rotatably mounted upon pivots 35 secured to the side frame members 21 of the main frame, and a pair of auxiliary frame members 36, secured to the cross members 22 and 23 in spaced parallel relation to the main frame members 21. Suitable links 37 connect the lower ends of the cam members with the dumping body 14 so that when the cams are rotated, the body will be tilted from the full line position shown in Figure 1 to an inclined position.

The cams 34 are shown provided with suitable sprocket teeth 38 adapted to receive chains 39. The end links 41 of the chains are secured to their respective cams by suitable pins 42, as shown in Figure 1. From the lower ends of the cams 34, the chains 39 pass upwardly over a pair of idler sprockets 43 mounted upon suitable studs 44 secured in position between the main frame members 21 and 36. The forward ends of the chains are connected to the ends of an equalizer bar 45 mounted for movement lengthwise of the main frame 18 in suitable guide slots 46 provided in the auxiliary frame members 36, as shown in Figure 1. The overall length of the equalizer bar 45 is slightly less than the spacing between the side frame members 21, whereby said bar may move freely therebetween, in a direction lengthwise of the trailer, while its movement in a crosswise direction is restricted.

A pair of suitable compression springs 202 are shown mounted upon rods 203 having their upper ends forked and pivotally connected to the cam members 34 by the pins or bolts 42. The rods 203 are slidably supported in guides 204 secured to the cross frame member 22, as best shown in Figure 1 whereby when the dumping body 14 reaches the limit of its upward tilting movement, the springs 202 are compressed between the nuts 205 on the lower ends of the rods 203 and the guides 204 and thus act to return the cam members to their normal positions.

A suitable hoisting mechanism, not shown in the present application, is provided on the trailer for tilting the dump body 14, and is adapted to be operatively connected to the power take-off shaft 10 of the truck engine, as will subsequently be described.

*Fifth wheel.—(Figures 1, 2, and 3)*

An important feature of this invention resides in the novel construction of the fifth wheel structure whereby power from the power take-off shaft 10 of the truck engine, may be transmitted therethrough to the body operating mechanism provided on the trailer. To thus transmit power from the engine through the fifth wheel structure of the apparatus to the body dumping mechanism on the trailer, the fifth wheel is shown comprising a lower gear casing 121 having a shaft 122 mounted therein, one end of which is connected by a universal joint 123 to a splined shaft 124. The opposite end of the shaft 122 is supported in a guide bearing 125 provided in a removable cap or plate 126 having one end of a rod 127 connected thereto by a shaft 128. The opposite end of the rod 127 is shown loosely supported between a pair of upstanding arms of a forked bracket 129, secured to the rear end portion of the frame of the truck chassis 2. A bevel gear 131 is keyed to the shaft 122 and meshes with a similar gear 132 suitably secured to the lower end of an upright shaft 133, rotatably mounted in a tubular extension 134 provided on the upper wall of the gear casing 121.

The tubular extension 134 of the gear casing 121 is rotatably supported in a depending member 135 having a flange 136 at its lower end. The member 135 and flange 136 constitute the king pin 13, as these members will hereinbefore be referred to. The king pin 13 is adapted to be engaged by the coupling dogs 8 of the lower fifth wheel member 7, as hereinbefore described.

The depending portion 135 of the king pin is shown integrally formed with a plate 137 having upstanding portions 138 and 139 provided with suitable bearings for supporting a relatively short horizontal shaft 141. The plate 137 is suitably secured to the cross member 23 of the main supporting frame and to an auxiliary cross member 142 secured to the side members 21 of the main frame. A bevel gear 143 is secured to the upper end of the upright shaft 133 and meshes with a similar gear 144 secured to the forward end of the horizontal shaft 141. A universal coupling 145 is secured to the rear end of the shaft 141 and has a shaft 146 connecting it to a similar universal joint 147 secured to the shaft 148 of the pump 65, as clearly illustrated in Figure 2. A suitable housing 149 is secured to the plate 137 of the fifth wheel member and to the upper upright portion 139 thereof to provide a closure for the bevel gears 143 and 144. An annular member 151 is suitably secured to the cross members 23 and 24 of the main supporting frame of the trailer and cooperates with the plate 137 to provide the upper fifth wheel member. This annular member 151 is clearly shown in Figures 2 and 3, and engages the upper surface of the lower fifth wheel member 7 to provide a suitable support for the forward end of the trailer.

The shaft 124 of the fifth wheel structure is operatively connected to the power take-off shaft 10 of the truck engine, whereby said shaft may be operated from the power of said engine. To thus connect the shaft 124 to the power take-off shaft 10, a shaft 152 is connected to the power take-off shaft by a universal joint 153. A splined coupling sleeve 154 is slidably engaged with the splined shaft 124, as shown in Figure 3, and has an extension 155 secured to the forward end thereof adapted to receive the shaft section 152. The extension 155 may be secured to the splined sleeve 154 by such means as welding. The extension 155 is secured to the shaft 152 by means of bolts 156, preferably arranged in right angular relation, as shown in Figure 3. When uncoupling the trailer from the truck, the coupling dogs 8 are released by manipulation of the locking bar 9, whereupon the truck may move out of engagement with the forward end of the trailer, it being understood that suitable means, not shown, is provided for supporting the forward end of the trailer when thus uncoupled from the truck. As the truck is moved away from the trailer, the splined coupling sleeve 154 will move out of engagement with the splined shaft extension 124, as will readily be understood by reference to Figure 3.

To couple the trailer to the truck, the latter is moved towards the trailer until the king pin 13 is received in the gap provided between the arms 12 of the lower fifth wheel member 7, said arms guiding the king pin into engagement with the dogs 8—8 which, by the action of the king pin, will be moved to the position shown in Figure 2, whereupon the locking bar 9 will automatically move into locking engagement with the dogs by the action of the springs 11. The bolts 156 securing the extension 155 of the splined coupling sleeve 154 to the shaft 152, are then removed and the extension 155 is relatively moved upon the shaft 152 in a forward direction until the terminal of the splined shaft 124 may be inserted into the coupling sleeve 154. When the splined shaft 124 has thus been inserted into the sleeve 154, the bolts 156 are inserted into the alined sockets provided in the extension 155 and shaft 152, to thereby secure the extension 155 to said shaft whereupon the shaft 124 will be operatively connected to the power take-off shaft of the truck engine, as will readily be understood. The rearwardly extending rod 127 of the fifth wheel operates to longitudinally aline the shaft 122 with the truck body.

Because of the novel construction and arrangement of the operating mechanism and the associated parts of the semi-trailer, said trailer may be made comparatively short, which is an important feature in that the overall length of the entire apparatus may be considerably reduced as compared to apparatus of this general nature. It is also to be noted that the load-carrying body 14 is so mounted upon the main frame of the trailer that when tilted to a load-dumping position, the center of gravity thereof will be forwardly of the rear axle 26 whereby the trailer cannot tip over rearwardly.

To uncouple the trailer from the truck, the locking bar 9 is relatively pulled forwardly by suitable means, not shown, whereupon the dogs 8 will permit the release of the king pin 13. The drive shaft between the power take-off shaft 10 of the truck engine and the horizontal shaft 122 of the upper fifth wheel member, is automatically uncoupled when the truck is moved away from the trailer because of the splined coupling sleeve 154 moving out of engagement with the splined shaft extension 124. As hereinbefore stated, when the semi-trailer is uncoupled from the truck, suitable means, not shown, are provided for supporting the forward end thereof.

The novel fifth wheel structure herein disclosed is so constructed that the trailer may readily be coupled to or uncoupled from the truck in substantially the same manner as if connected thereto with an ordinary hitch. In other words, it is not necessary to dismantle the fifth wheel structure in any manner as is customary and necessary with some devices of this general character. To manipulate applicant's hitch to uncouple the trailer, it is only necessary to release the dogs 8—8 by forwardly moving the locking bar 9, whereupon the king pin 13 is withdrawn from the gap between the arms 12—12, as an ordinary king pin. The splined shaft 124 is slidably supported in the coupling member 154, whereby these two parts are readily disengaged from one another when the truck is moved forwardly with respect to the trailer. It is also to be noted, by reference to Figure 3, that the shafts 122, 133 and 141 are constantly operatively connected together by the gears 131—132, and 143—144, regardless of whether the trailer is coupled to the truck or tractor, or not. This is an important feature of applicant's fifth wheel structure, in that it assures that the shafts 122—133 and 141 are always operatively connected together for operation to transmit power through the fifth wheel when the drive shaft 124 is operatively connected to the power take-off shaft of the truck engine. The shaft 146 is connected to the operating mechanism on the trailer, whereby said mechanism may be operated to tilt the dump body 14. This mechanism is shown and described in a division application.

I claim as my invention:

1. A semi-trailer comprising a frame provided with rear carrying wheels and having a mechanism thereon adapted to be driven, a fifth wheel member at the forward end of the trailer frame comprising a king pin adapted to be coupled to the fifth wheel member of a truck, a shaft rotatably mounted in said king pin and having an operative connection with the driven mechanism on the trailer, a gear box supported by and depending from said king pin and adapted for rotation relatively thereto, a stub shaft in said gear box operatively connected to the shaft within said king pin, and a drive shaft for connecting said stub shaft to the power take-off shaft of the truck engine whereby the driven mechanism on the trailer may be operated by the truck engine, said king pin and gear box being connected together as a unit and forming a part of the trailer fifth wheel member, whereby when the trailer is uncoupled from the truck, the king pin, gear box, and other associated parts are removed therewith from the truck.

2. A semi-trailer comprising a frame provided with rear carrying wheels and having a mechanism thereon adapted to be driven, a fifth wheel member at the forward end of the trailer frame comprising a king pin adapted to be coupled to the fifth wheel member of a truck, a shaft rotatably mounted in said king pin and having a driving connection with the driven mechanism on the trailer, a gear box supported by and depending from said king pin and adapted for rotation relatively thereto, a stub shaft in said gear box operatively connected to the shaft within said king pin, a telescopic shaft for connecting said stub shaft to the power take-off shaft of the truck engine whereby said driven mechanism on the trailer may be operated by the truck engine, and a member operatively connected to said gear box and loosely engaged with the rear end of the truck frame and adapted to longitudinally aline said gear box with the truck frame to thereby relieve the power transmission means in the fifth wheel structure of abnormal strains when operated, and said king pin and gear box being non-detachably connected together as a unit and forming a part of the trailer fifth wheel member.

3. In a fifth wheel structure for coupling a semi-trailer to a motor vehicle having an engine and a lower fifth wheel member provided with co-acting dogs, an upper fifth wheel member on the trailer comprising a hollow king pin adapted to be readily coupled to or uncoupled from said lower fifth wheel member by said dogs, a mechanism on the trailer to be driven, means passing through said king pin for transmitting power from the engine to said mechanism, said power transmitting means being supported entirely by the king pin and movable therewith as a unit, when the trailer is uncoupled from the motor vehicle, and means for controlling the operation of the dogs to couple the trailer to or uncouple it from the vehicle.

4. In a fifth wheel structure for coupling a semi-trailer to a motor vehicle having an engine and a lower fifth wheel member provided with co-acting dogs, an upper fifth wheel member on the trailer comprising a king pin adapted to be readily coupled to or uncoupled from said lower fifth wheel member by said dogs, a mechanism on the trailer to be driven, means passing through said king pin for transmitting power from the engine to said mechanism, said power transmitting means being permanently mounted in and supported by said king pin and movable therewith as a unit, when the trailer is uncoupled from the motor vehicle, and means for controlling the operation of the dogs to couple the trailer to or uncouple it from the vehicle.

5. In a fifth wheel structure for coupling a semi-trailer to a motor truck having an engine thereon and a lower fifth wheel member provided with co-acting dogs, an upper fifth wheel member on the trailer comprising a hollow king pin adapted to be coupled to said lower fifth wheel member by said dogs, a mechanism on the trailer to be driven, a driving connection between said mechanism and the truck engine passing axially through said king pin and permitting free turning movement of the trailer with respect to the truck, said driving connection being permanently mounted in said king pin and supported entirely thereby and movable therewith as a unit, when the trailer is uncoupled from the truck, and means for controlling the operation of the dogs to couple the trailer to or uncouple it from the vehicle.

6. In a fifth wheel structure for coupling a semi-trailer to a motor truck having an engine thereon and a lower fifth wheel member provided with co-acting dogs, an upper fifth wheel member on the trailer comprising a king pin adapted to be coupled to said lower fifth wheel member by said dogs, a mechanism on the trailer to be driven, power transmission means operatively connected to said mechanism and passing axially through said king pin and adapted to be operatively connected to the truck engine and permitting free turning movement of the trailer with respect to the truck, said power transmission means being permanently mounted in said king pin and movable therewith as a unit, when the trailer is uncoupled from the truck, and means for controlling the operation of the dogs to couple the trailer to or uncouple it from the vehicle.

7. In a fifth wheel structure for coupling a semi-trailer to a motor truck comprising an engine and a lower fifth wheel member, an upper fifth wheel member on the trailer comprising a hollow king pin adapted to be coupled to said lower fifth wheel member, a mechanism on the trailer to be driven, an upright shaft passing through said king pin and having its upper end operatively connected to said mechanism, a drive shaft for coupling the lower end of said upright shaft to the truck engine whereby the mechanism may be driven therefrom, and said upright shaft and a portion of said drive shaft being permanently retained in the king pin and movable therewith as a unit, when the trailer is uncoupled from the truck.

8. In a fifth wheel structure for coupling a semi-trailer to a motor truck comprising an engine and a lower fifth wheel member, an upper fifth wheel member on the trailer comprising a king pin adapted to be coupled to said lower fifth wheel member, a mechanism on the trailer to be driven, an upright shaft passing through said king pin and having its upper end operatively connected to said mechanism, a drive shaft for coupling the lower end of said upright shaft to the truck engine whereby the mechanism may be driven therefrom, said upright shaft and a portion of said drive shaft being permanently retained in the king pin and movable therewith as a unit, when the trailer is uncoupled from the truck, and means for maintaining said drive shaft in alinement with the truck engine, when the trailer is coupled to the truck.

9. In a fifth wheel structure for coupling a semi-trailer to a motor truck comprising a lower fifth wheel member and an engine, an upper fifth wheel member on the trailer comprising a king pin provided with a longitudinal bore, a mechanism on the trailer to be driven, a shaft rotatably mounted in the king pin and having its upper end operatively connected to said mechanism, a drive shaft operatively connecting the lower end of said shaft to the truck engine, whereby power may be transmitted from the engine through the king pin to said mechanism, and means independent of said drive shaft and cooperating with means on the truck for maintaining the drive shaft in alinement with the truck engine to thereby relieve it of lateral strains during turning travel of the apparatus.

10. In a fifth wheel structure for coupling a semi-trailer to a motor truck comprising a lower fifth wheel member and an engine, an upper fifth wheel member on the trailer comprising a king pin having a longitudinal bore therein, a mechanism on the trailer to be driven, a gear box disposed beneath said king pin and having a cylindrical extension received in the bore therein, an upright shaft rotatably mounted in said extension and having its upper end operatively connected to said mechanism, a stub shaft mounted in said gear box and having a geared connection with said upright shaft, a drive shaft operatively connecting said stub shaft to the power take-off shaft of the engine, whereby power may be transmitted from the engine to said mechanism through the king pin, and means connected to said gear box and cooperating with means on the truck frame to thereby prevent relative rotary movement of said gear box with respect to the truck frame.

11. In a fifth wheel structure for coupling a semi-trailer to a motor truck comprising a lower fifth wheel member and an engine, an upper fifth wheel member on the trailer comprising a king pin having a longitudinal bore therein, a mechanism on the trailer to be driven, a gear box disposed beneath said king pin and having a cylindrical extension received in the bore therein, an upright shaft rotatably mounted in said extension and having its upper end operatively connected to said mechanism, a stub shaft mounted in said gear box and having a geared connection with said upright shaft, a drive shaft operatively connecting said stub shaft to the power take-off shaft of the engine, whereby power may be transmitted from the engine to said mechanism through the king pin, and a rod having one end pivotally connected to said gear box and having its opposite end portion cooperating with means on the truck frame to thereby prevent relative rotary movement of said gear box with respect to the truck frame.

12. In a fifth wheel structure for coupling a semi-trailer to a motor truck comprising a lower fifth wheel member and an engine, an upper fifth wheel member on the trailer comprising a king pin having an axial bore therein, a mechanism on the trailer to be driven, a gear box disposed beneath said king pin and having a cylindrical extension received in the bore therein, an upright shaft rotatably mounted in said extension and having its upper end operatively connected to said mechanism, a stub shaft mounted in said gear box and having a geared connection with said upright shaft, a telescopic drive shaft operatively connecting said stub shaft to the power take-off shaft of the engine, whereby power may be transmitted from the engine to said mechanism through the king pin, means on said gear box cooperating with means on the truck frame to thereby prevent relative rotary movement of said gear box with respect to the truck frame, during turning travel of the apparatus, and said gear box, rod, and a portion of the drive shaft being non-detachably supported on the king pin and movable therewith as a unit, when the trailer is uncoupled from the truck.

HAROLD A. CEDERSTROM.